US005743920A

United States Patent [19]
Kohan

[11] Patent Number: 5,743,920
[45] Date of Patent: Apr. 28, 1998

[54] NO-MESS OPHTHALMIC LENS TINTING PROCESS

[76] Inventor: George Kohan, 16139 Chief Dr., Hudson, Fla. 34667

[21] Appl. No.: 702,135

[22] Filed: Aug. 23, 1996

[51] Int. Cl.⁶ .................................................. D06P 5/00
[52] U.S. Cl. ...................... 8/506; 8/524; 8/552; 8/561; 8/562; 8/563
[58] Field of Search .................... 8/524, 526, 506, 8/516, 561.3

[56] References Cited

U.S. PATENT DOCUMENTS

| 1,289,968 | 12/1918 | Toot et al. | 8/526 |
| 4,046,507 | 9/1977 | Zweifel et al. | 8/526 |
| 4,076,496 | 2/1978 | Hamano | 8/506 |
| 4,780,103 | 10/1988 | Minowa | 8/509 |
| 5,028,660 | 7/1991 | Kobashi et al. | 525/148 |
| 5,180,651 | 1/1993 | Mason | 430/138 |

FOREIGN PATENT DOCUMENTS 40419382  7/1992  Japan.

*Primary Examiner*—Margaret Einsmann
*Attorney, Agent, or Firm*—Stephan A. Pendorf, P.A.

[57] ABSTRACT

A safe, neat and more convenient process for tinting plastic optical lens substrates is provided by a novel packaging system. The tint dyes are provided in a water-soluble tint packet for the convenient preparation of solutions for tinting optical lens substrates. The tint packet has an indefinite shelf life, is stable even in summer temperatures and high humidity, protects the user from any contact with the dye material, and does not leave solid waste for disposal.

11 Claims, No Drawings

5,743,920

NO-MESS OPHTHALMIC LENS TINTING PROCESS

FIELD OF THE INVENTION

The present invention addresses the problem of providing a safer, neater and more convenient process for tinting plastic optical lens substrates, and solves the problem with a novel packaging system. The tint dyes are provided in a water-soluble tint packet for the convenient preparation of solutions for tinting optical lens substrates. The tint packet has an indefinite shelf life, is stable even in summer temperatures and high humidity, protects the user from any contact with the dye material, and does not leave solid waste for disposal.

BACKGROUND OF THE INVENTION

A major marketing advantage which plastic ophthalmic lenses currently enjoy over glass lenses is the capability of accepting, on their surfaces in the finished state, organic tints exhibiting a wide range of colors. The tintability of the most common plastic substrate, CR-39 [poly(diallyl diglycol carbonate)], results from the dipolar attraction between the carbonate (O—CO—O) carbonyl groups of the polymer and the solubilizing groups, e.g., hydroxyl or sulfonic acid species, of the azo or anthraquinone dyes which constitute the active part of the tinting solutions.

The ready capability of surface tinting plastic lenses provides the eyeglass dispenser, e.g., the optician, optometrist, or ophthalmologist, with the opportunity to perform lens tinting on an on-site basis. Thus, purchasers of plastic lenses have the option of selecting lenses custom tinted in a substantially infinite spectrum of colors and styles, such as fashion tints, gradient tints, sunglass tints, and ultraviolet radiation blocking tints, and those lenses can be readily surface tinted by the eyeglass dispenser in his office or laboratory within a relatively short time.

The dyes or pigments used to tint lenses are initially produced and packaged in powdered form, and are used by dispersing or dissolving the dyes in a water bath into which the lenses to be tinted can be dipped. For example, it is known to provide tint crystals in a small zip-lock type bags. To use, the packet is opened and the dye crystals are dumped into the dye tank and stirred at the proper temperature to prepare a tint bath.

There are, however, several problems associated with the use of these dyes due to their toxicity, ability to form permanent stains, and high concentration. Dyes are generally provided in the form of fine powders, are liable to becoming airborne during opening or pouring the contents of a package, and any accidental exposure of the user or the immediate environment to the dyes will cause coloration, staining, or even physical harm. Further, it is difficult to accurately measure dyes during the addition of the dyes to water tanks. Finally, there is a problem in disposal of the tint-contaminated package in which the dyes were delivered.

There is thus a need for a more convenient process for tinting ophthalmic lenses, which process would enable the optometrist to stock a small number of lenses, yet custom tint plastic lenses of any required prescription, including non-prescription lenses, and also to render the lenses UV-protective and scratch resistant as required by the customer.

SUMMARY OF THE INVENTION

For the above reasons, the present inventor investigated the problem and conceived of the idea that it may be possible to package water soluble or dispersible dyes in packets made of water soluble films. Such packets would have the following advantages: their use would avoid the risk of human contact with the concentrated dyes, the accuracy of measurements of dyes would always be assured, and the solid waste disposal problem would be eliminated.

However, the inventor considered that such films for forming the packets must satisfy a number of requirements. First, the films must be readily obtainable, easy to work with, and easy to seal. Second, the films must be relatively inert to the dye contents during storage prior to use, even when exposed to high humidity and high summer temperatures. Third, the monomeric or polymeric units of the film, or any additives or modifiers in the film, once dissolved or dispersed in the tinting solution, must not adhere to the poly(diallyl diglycol carbonate) lens substrate, thereby fogging, spotting, or deteriorating the opacity of the lens. Fourth, the chemical composition of the dissolved films must not interfere with the chemical reaction between the dyes and the lens substrate. Finally, the films must be inexpensive and environmentally safe.

As a result of careful investigation and experimentation, the present inventor discovered that it is indeed possible to enclose dyes or pigments for tinting ophthalmic an other lens substrates in a packet made of a water soluble film, which film possesses all the above mentioned desirable characteristics and none of the above-mentioned undesirable characteristics. The film of the dye packet, when introduced into a dye tank, quickly dissolves away in the aqueous tinting solution, exposing the dye to mix with the water, and does not interfere with the tinting process.

In a further embodiment of the invention, the dissolvable packet is packaged in a secondary, external attractive waterproof wrapper or envelope which provides additional long-term storage protection as well as the ability to label the packet with, e.g., the type of dye, the color or shade of dye, the UV-absorptive capacity, directions for use, warnings, batch identification, etc.

In a further embodiment of the invention the tinting dyes are packaged in gelatin capsules (gelcaps). While gelcaps are readily available commercially in the pharmaceutical industry for manufacture of capsules intended to be swallowed, these gelcaps have what initially appears to be a disadvantage—namely, they enclose only a relatively small space. Commercially available gelcaps are not capable of containing the amount of dye necessary for preparing a tint bath. However, the inventor turned this into an advantage. Namely, by providing pre-measured amounts of dye in individually marked and packaged gelcaps, it becomes possible to (1) vary the concentration of the tint bath by varying the number of capsules added to the water bath, and (2) to vary the color or shade of the tint by combining various gelcaps containing different dyes. The end color is not always easily determined, and in the case of mixing dyes to produce a custom tint, it is preferred to provide the capsules with a color chart or recipe table.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other dye packets and tinting processes for carrying out the same purposes of the present invention. It should also be realized by those skilled in the art that such equivalent structures do not depart from the spirit and scope of the invention as set forth in the appended claims.

DETAILED DESCRIPTION OF THE INVENTION

The lens substrates to be tinted, the tinting procedure, and the specific dyes used in the present invention are conventional and need not be described here in detail. The significant feature of the present invention resides in the use of gelatin based encapsulating materials for prepackaging premeasured quantities of tint dyes for easy addition to the tinting bath.

Lens Substrates

The water soluble dye packet and process of the present invention can be used to dye a wide variety of lens substrates. The lens may be prescription or non-prescription, and may be constituted of any of the plastic (organic) polymers conventionally available or as disclosed in the patents discussed in the background or detailed sections of the present application, the disclosures of which are incorporated herein by reference.

The most common monomer utilized to produce stock optical plastic lenses is diethylene glycol diallyl carbonate (DAC), marketed by AKZO Chemicals, Inc. of Dobsferry, N.Y. and PPG Industries, Inc. of Pittsburgh, Pa. under the trademarks NOURYSET 200® and CR-39®, respectively. This monomer is used in the industry due to the clarity, strength, impact resistance, resistance to discoloration, and resistance to physical warping or distortion of products made therefrom. CR-39® is generally considered to be one of the most difficult lens substrates to tint, and any dye which can tint this substrate will likely tint other substrates.

The invention will be illustrated hereafter using this type plastic, referred to hereafter as CR-39®, for illustrative purposes. However, it will be readily understood that the present invention is not limited to this polymer. For example, U.S. Pat. No. 5,422,046 (Tarshiani, et. al.) teaches a method for casting plastic lenses having a refractive index higher than the lenses made of the conventional DAC monomer, and such lenses are within the contemplation of the present invention. The present invention can be applied to any other preformed "plastic" optical lens regardless of the composition or manner in which such lens was formed. As used herein a "plastic" lens is simply one fashioned from optical quality resin materials. Such materials include without limitation mixtures containing allylic esters such as triallyl cyanurate, triallyl phosphate, triallyl citrate, dialyphenyl phosphonate, acrylic esters, acrylates, methyl, allyl and butyl methacrylates, polycarbonates, styrenics, LEXAN, polyesters such as those formed of ethylene glycol maleate, and other liquid monomer/polymer materials having high indices of refraction (such as HiRi which is a trademark of PPG Industries).

Preferred resin compositions include allyl diglycol carbonates, allylic esters, triallyl cyanurate, triallyl phosphate, triallyl citrate, diallyl phenyl phosphonate, acrylic esters, acrylates, methyl methacrylate, allyl methacrylate, butyl methacrylate, polycarbonates, styrenics, LEXAN, polyesters, high index plastics, medium index plastics, urethanes, epoxies and silicones.

In addition, the invention may be applied to glass lenses by either selecting pigments, dyes or tint agents specific for glass, or by first coating a glass lens substrate with a thin veneer of resin which not only adheres to glass but also has a high affinity for dyes. See, for example, U.S. Pat. No. 4,977,029 (Brown et al) teaching dye absorptive resin coatings for application to glass lenses. After coating, the lens is exposed to the same organic dyes used to tint plastic lenses.

Types of Dyes

A wide variety of azo or anthraquinone dyes may be used in the present invention. Further, dyes as frequently employed to dye textiles are also likely to be useful for tinting lens substrates.

The term "tint" or "dye" as used herein is not intended to refer only to visible light absorbing dyes, but also UV absorbers. The terms are intended to refer to not only fixed dyes, but also reversible photochromic dyes as well known in the art. Finally, the invention is intended to provide for safe and convenient delivery of any number of other additives which are added to baths for coating lens substrates, such as hard coat materials for protecting lens surfaces and/or imparting scratch resistance, surfactant or wetting agent, an agent such as NECANOL #90 which is used to soften the lens so that it can better accept the tint, etc. However, the most useful aspect of the invention is believed to be with respect to the neat and discrete encapsulation of stains and dyes in premeasured amounts, with which it becomes easy to controllably and reproducibly tint lens substrates.

In creating custom lens tints, a multitude of formulations may be prepared beginning with dyes of the primary colors, yellow, red, and blue, to create all the colors necessary to meet the demand of the optical industry. That is, by mixing the three primary colors, any color requested by a client may be produced.

In accordance with the embodiment of the invention wherein dyes are incorporated in gelcaps, these dye containing gelcaps have been found to be particularly useful in practice. Namely, the gelcaps can be used not only for delivering standard tints, but also for delivering custom tints.

For example, it has been found to be possible on the one hand to provide pre-mixed dyes for forming common tints, e.g., brown or grey tints. A batch of blue and orange tint may be mixed and this mixture encapsulated in gelcaps to provide a batch of brown tint gelcaps. To use, 4 to 7 gelcaps, usually about 6, are dissolved in water and thereby produce a brown tint bath.

On the other hand, primary colors can be encapsulated in gelcaps and the gelcaps can be marked. Then, following a chart or based upon experience, a lens crafter can select, e.g., 2 blue, one red, one magenta, and one gray dye capsule to produce a custom tint.

Any dye packet or capsule can contain pure dyes, or can contain dyes and additional additives as discussed above.

The Water Soluble Films

The water soluble films used to envelope the dyes should be transparent, non-tacky, inert to a wide variety of dyes, heat sealable, thermoformable and mechanically strong. The packet produced from such films should be stable during storage over a wide range of temperatures and humidity.

As water soluble films, polyvinyl alcohol resin (abbreviated as "PVA" hereinafter), polyethylene oxide resin (abbreviated as "PEO" hereinafter), methyl cellulose, hydroxy propyl cellulose, starch and the like have been known heretofore; however, recently water soluble films especially made of PVA have been widely employed. Water soluble transparent film dissolving in water at 95-100 degrees C. in one minute or less, preferably in 30 second or less in used.

A limited variety of films having the aforementioned characteristics may be used to form the dye packets of the present invention.

Polyvinyl alcohol (hereinafter referred to as "PVA") is a water-soluble polymer which is widely used for water-soluble films and in other fields. For example, U.S. Pat. No. 3,556,765 (Houston) teaches a water soluble pesticide packet for submersion in water to form a liquid pesticide spray. Upon submersion, the PVA film encapsulating the pesticide powder dissolves exposing the soluble pesticide powder. PVA films modified for water solubility are, in general, useful in the present invention.

PVA which has a degree of saponification ranging from 80 to 95 mol % exhibits a rapid water solubility. PVA which has a degree of saponification of at least 98 mol % is called "completely saponified PVA" and is dissolved in water when it is allowed to stand in the water for a long period of time or if it is placed into hot water. However, completely saponified PVA does not promptly dissolve in cold water.

PVA having a degree of saponification ranging from 80 to 95 mol % is stable in a neutral pH region, however, when it contacts an alkaline substance, saponification of the remaining ester groups increases and the degree of saponification deviates from the above-mentioned range and exceeds this range. Accordingly, prompt solubility in cold water is lost.

The reason why completely saponified PVA is not immediately soluble in water is because the polymer is crystalline. More specifically, it is believed that because the hydroxyl groups of PVA form very strong hydrogen bonds intermolecularly, then crystallization results and the intrusion of water molecules is inhibited.

It was found that the PVA derivative can be rendered cold water soluble if the instant pouch has a basic structure comprising vinyl alcohol units, vinyl acetate units and acetalized vinyl alcohol units, wherein the viscosity average degree of polymerization based on the vinyl monomer units is 200 to 500, the content of the vinyl alcohol units is 70 to 90 mol %, the content of the vinyl acetate units is 0 to 2 mol %, and the degree of acetalization is 10 to 30 mol %.

A warm water soluble film may consist essentially of a partially hydrolyzed thermoplastic PVOH film. Suitable PVOH's for this second layer are those which are 75 to 90 mole %, preferably 86–89 mole %, hydrolyzed and have a degree of polymerization (DPn) in the range of 200 to 2,500, i.e., viscosities of 2 to 30 cps at 20° C. as 4% aqueous solutions. Also suitable are vinyl alcohol copolymers which contain methyl methacrylate as disclosed in U.S. Pat. No. 3,689,469 or copolymers containing up to 3–4 mole % other copolymerized monomer.

Particularly preferred is a film disclosed in U.S. Pat. No. 5,487,947 (Kakishita, et al.). This patent teaches a film superior in water solubility, especially solubility in cold water, storage stability and transparency under high temperature atmosphere, and in ease of manufacture. The film is actually a layering of a special film mainly made of a specific water soluble high molecular compound composed of a repetitive unit represented by a general formula (1) laminated to a PVA film. Since both of the PVA film and the special film are superior in transparency, the water soluble composite film is also superior in transparency. It is possible to heat seal the water soluble composite film at a low temperature by placing the above special film so as to face the heat seal side, because the special film is relatively superior in heat fusibility at a low temperature.

In this case, the temperature for lamination is set at a low temperature, for example, between 70° and 100° C. Heat sealing does not cause insolubility, so that the heat sealed packet formed from the film demonstrates excellent solubility in cold water and the like. Besides, since the film is superior in chemical resistance, the water soluble composite film has an advantage that the properties thereof do not change by wrapping chemicals and the like.

Furthermore, when forming the film with the above water soluble high molecular compound, if necessary, thermostable agents, antioxidants or ultraviolet absorption agents can be added as appropriate in order to prevent heat deterioration in processing to form a film, or ultraviolet deterioration or ozone deterioration to occur during storage. Still furthermore, if transparency is not required, in addition to the above additive, mineral filler such as carbon, titanium oxide and the like can be added within the scope of 3 to 20 weight parts (as referred as part(s) hereinafter) of the entire material, mainly composed of the water soluble high molecular compound, for forming the film so as to form an opaque film.

The water soluble composite film can be manufactured, for example, by either of two methods as follows. The first method is to layer the PVA film and the film mainly made of a specific water soluble high molecular compound, each which is formed individually. That is, PVA films can be manufactured in a conventional and known method (casting, extrusion and the like) by employing the above materials for PVA films. On the other hand, special film can be manufactured in a conventional method for example, solution casting method, fusion extrusion with T-die or inflation, or calendering method by employing the forming materials mainly made of the specific water soluble high molecular compound. Subsequently, the above two films are heat-pressing laminated at a low temperature, for example, 70° to 100° C. so as to form the film. The second method is to manufacture the PVA film in advance, and to fusion extrude the above materials for the special film on the film side of this PVA so as to form the composite film or to make the composite film on the film side of the above PVA film by casting resin solution for the above film. Taking the actual production into consideration, the above fusion extrusion, calendering method or fusion extrusion on the PVA film to form composite film is preferable. In addition, it is possible to layer them by partial adhesion, if necessary.

In the above water soluble composite film, the thickness of each film is not critical, and depends on the purpose and application field, however, since thinner is more desirable, a PVA film of preferably not more than 25 μm (abbreviated as μ hereinafter) is suitable. That is, as the thickness exceeds 25μ, water solubility begins to deteriorate. Furthermore, since the special film is superior in water solubility, it is desirable that the film thickness is thickened relative to the PVA film, which results in high strength and excellent chemical resistance. Specifically, the thickness of the film can be selected based upon the degree of film strength, chemical resistance and water solubility, usually, 5 to 200μ is preferable, 20 to 100μ is more preferably, and 30 to 60μ is most preferable.

Thus, in one embodiment, the water soluble composite film in this invention may be provided with the combined or laminated above PVA film and the special film. For example, when manufacturing a bag with a water soluble composite film as a package material, it is preferable to put the PVA film outside and to put the special film inside. In this case, if the package is basically provided with only the above structure and no further protection, then a two-layer structure of two composite films, or a multi-layer structure of three layers or more is preferred. Thus, placing each film properly prevents not only water solubility but also blocking under high temperature and high humidity atmosphere such as in the summer.

When heat press laminating and heat sealing with the water soluble composite film in this invention, the above laminating an heat sealing can be conducted within the scope of temperature between 70° and 100° C., because the melting point of the above water soluble high molecular compound is low (about 55° to 60° C.). Therefore, excellent water solubilities can be retained without causing insolubilities of the PVA film. In addition, a plasticizer (for example, glycerin and low molecular weight polyethylene glycol), which is used to plasticize the PVA film and is contained therein, does not exude and penetrate into the space between the layers.

The cold water soluble polyvinyl alcohol derivative film is easily formed into the shape of a pouch or bag in order to hold a desired amount of powder dye, and then heat sealed.

In instances where a resin is used which is soluble in water at relatively low temperatures, or is soluble in water at a broader range of pH conditions, the film may be protected from accidental failure (i.e. weakening or dissolving by water) by enclosing the package inside an overwrap material. Such overwrap materials in the form of bags, pouches or the like are well known in the art and are typically made up of polyolefin monolayer or multilayer films or laminates. These overwrap materials can also be made from paper, metal and substances besides synthetic polymers.

In practicing the present invention, two problems can sometimes occur. First, these films can become tacky over time. Second, the rate of dissolution of the film can be slower than desired. These problems can be overcome to some extent by adding a water soluble filler to one or more resins making up the film. This is preferably done by compounding the agent as a powder into a base resin prior to or during extrusion.

Such fillers can solve the tackiness problem by acting as an antiblock, which reduces blocking and improves processing and converting operations.

Such fillers can also dissolve quickly, promoting dispersion of the polymer. This in turn increases, the surface area of the material, speeding up dissolution.

When properly selected, these fillers can also function as a pigment.

Water soluble fillers meeting one or more of these properties (antiblock effect, increased dissolution effect, or pigment-bearing) are included in the case resin preferably in a masterbatch preferably in sufficiently small particle size for conversion to film. A particle size of about 5 microns or less is preferred.

The water soluble fillers can be compounded into the base resin on conventional compounding equipment such as a twin screw. Stainless steel cooling belts can be used instead of water, to cool and/or quench the resulting strands. Such belts are commercially available from Sandvik and Berndorf. The compound resin can then be used in conventional extrusion operations to produce water soluble film.

Suitable water soluble fillers include any material which is water soluble, or substantially so, and capable of being incorporated into the film structures disclosed in this specification. Preferred materials are salts, such as sodium carbonate ($Na_2CO_3$); sodium sulfate ($Na_2SO_4$); sodium chloride (NaCl); potassium carbonate ($K_2SO_4$); and potassium chloride (KCl).

One or more of these water soluble fillers can be included in one or more of the layers of the water soluble film of the invention. The filler can be present in any suitable concentration in a given layer. Optimal concentrations will be governed to some extent by the nature of the filler, the nature of the base resin, and specific end use of the film, processing the packaging equipment, and other factors. A preferred concentration of the filler or fillers for a given layer of the film is between about 100 parts per million (0.01%) and 200,000 parts per million (20%) by total weight of the layer.

Gelatin Capsules

The gelatin capsules, or "gelcaps", which can be used in the present invention may be made of any material generally satisfying the same requirements as discussed above for water soluble films, but for reasons of economy it is preferred to use gelcaps which are already commercially available at low cost.

Specific examples of gelcaps include those such as those comprising gelatin and up to 3 wt % of an ester of a fatty acid (e.g., esters of fatty acids of edible oil or fat origin) and a glycerol and derivatives thereof, as described in The Official Regulation on Food Additives and as disclosed in U.S. Pat. No. 5,456,746 (Kokubun et al), incorporated herein by reference.

The gelatin capsule may be an unmodified gelatin with a plasticizer such as glycerin or sorbitol incorporated therein.

The gelatin capsule in which the gelatin amino groups are rendered less reactive to encapsulated materials may be a succinated gelatin capsule, or a succinated gelatin capsule to which polyethylene glycol has been added as taught in U.S. Pat. No. 5,419,916 (Yamamoto et al).

Yet further possible gelcap formulations desirable for oxygen impermeability and stability are disclosed in U.S. Pat. No. 4,917,885 (Chiba et al), and in particular hard capsules formed of a polymer blend of a water-soluble cellulose ether (e.g., alkyl cellulose, hydroxyalkyl cellulose and alyl hydroxyalkyl cellulose) and a polyvinyl alcohol in a weight ratio of 70:30 to 98:2.

As can be seen from the above, the gelcaps can be widely selected, but once given the concept according to the present invention any person of ordinary skill in this art can readily determine whether a particular gelcap will be operable for the purposes of the present invention.

The Tinting Process

The tinting process is a conventional process except that instead of measuring and adding dyes or ingredients in the form of dry powders, the powders are simply added by dropping packets or capsules of the dyes directly to the water.

The lens substrate is cleaned thoroughly with detergent and warm tap water. The lens is then rinsed well, first in tap water and then de-ionized water, and thereafter dried in ambient air.

The tinting bath comprising primarily water and optionally hard coat materials, wetting agents, solubilizers, or any materials conventionally employed in the art, is heated to about 95° C.–100° C., after which the dye packet or from 4 to 7 gelatin capsules containing dye or other pre-measured additive is introduced. No additional agitation is necessary and after 20 seconds the film material of the dye packet will have completely dissolved or dispersed, releasing the dye to the water to produce a ready dye bath. The lens to be tinted is immersed in the dye bath for 1–5 minutes, depending upon the constitution of the lens and the degree of tinting desired. Where it is preferred to bias the tinting toward, e.g., the upper half of the lens, the upper half of the lens is allowed to remain in the tinting solution for a longer period of time than the lower half. To create an even blend between the darker tinted area and the lighter tinted area, the lens is "bobbed" or moved up and down in the bath, so that no sharp line of demarcation is created between the darker and lighter tinted areas.

Where it is desired to tint a bifocal or other uneven lens, it may be desirable to tint only the back surface of the lens; however, there is conventionally no problem in tinting bifocal lenses.

The lens is thereafter removed from the tinting solution, rinsed with tap water, and then patted dry with a soft absorbent material. Finally, the tinted lens is allowed to air dry.

EXAMPLES

Example 1

According to the tint to be ultimately produced, dyes of the primary colors, yellow, red, and blue, were mixed as needed to produce approximately 50 lbs. of dry tinting material. Azo dyes were the type of dyes used. The dry material was placed in the filling bin on the top of a packet filling machine sold by GEMCO (General Equipment and Machinery Company), of South Miami, Fla. The machine was turned on and allowed to warm up. The tinting material traveled by gravity down to a volumetric filler and was proportioned into 12 gram portions which were enclosed in the individual packets, which were then heat sealed by a vertical sealer to hermetically enclose the tinting material.

The vertical sealer temperature was 65° C. and the horizontal temperature was 150° C. The packet material was DISSOLVO POUCH 45 manufactured by CMS Gilbreth Packing Services, Bensalem, Pa. The finished packets resembled a flocked pouch rather than a plastic bag. The material had dimensional stability in all situations, such as slitting or printing. The material is easily printable. Even when forming the packets in conditions of high temperature and high humidity, the material did not elongate due to hydroscopy.

Next, the inner dissolvable packet was enclosed in a paper envelope or an outer wrapper made from clear foil, wax foil or regular foil packet material. The envelope was 3.5 by 3.5 inches. This process occurs further along in the machine so that the original dissolvable pack becomes an inner packet within an outer protective packet.

The tint packet so produced was then tested to ensure that it was ready for use. A tinting bath containing water was heated, and the tint packet containing azo dye was introduced into the hot water. In the standard water temperature which is commonly used in optical tinting application, 200° F. (95° C.), the packet material dissolved in approximately 17 seconds.

A CR-39 lens was tinted in accordance with the following procedure. The lens substrate was cleaned thoroughly with detergent and warm tap water. The lens was then rinsed well, first in tap water and then de-ionized water, and thereafter dried in ambient air. The lens to be tinted was immersed in the dye bath for 3 minutes.

The lens was thereafter removed from the tinting solution, rinsed with tap water, and then patted dry with a soft absorbent material. Finally, the tinted lens is allowed to air dry.

The result was a lens tinted to an even gray color.

Imparting Scratch Resistance

CR-39 plastic ophthalmic lenses are relatively hard and scratch-resistant when compared to other plastic ophthalmic lenses. However, the scratch-resistance of CR-39 lenses is lower than that of glass. Accordingly, it may be desirable to apply scratch-resistant coatings to CR-39 and other plastic ophthalmic lenses. A wide variety of coating techniques and materials have been proposed over the years for coating lenses with scratch resistant layers. These include applying coating solutions by spin, dip, spray or flow coating. An automatic apparatus for applying scratch-resistant coatings to plastic ophthalmic lenses is disclosed in U.S. Pat. No. 5,246,499 (Peralta et al.). Suitable materials and means for applying them are known in the art, including without limitation those disclosed in U.S. Pat. Nos. 4,758,448 and 4,544,572.

In a further embodiment of the present invention, an ophthalmic lens is treated by a process comprising obtaining a plurality of gelatin capsules, wherein each of the capsules is in at least two sections, introducing a quantity of dry powder dye into each of the capsules, closing said capsules to seal said dry powder dye within said capsules, adding at least one of the capsules to an aqueous solvent to dissolve said gelatin capsules and form an aqueous dye bath, and submerging an ophthalmic lens to be tinted in said dye bath for a time sufficient to dye the ophthalmic lens. Indicia may be printed on the closed capsules. Optionally, two or more capsules containing different dyes may be added to the aqueous solvent.

The above examples were presented in order to illustrate the invention and are not intended to limit the invention in any way. Those working in the art would readily appreciate that substantial modifications within the scope of the invention may be made to the illustrative embodiments. The water soluble packet or gelcap according to the invention can enclose not only optical tints and UV absorbers, but also other powder materials which are added to tint baths in premeasured amounts, such as "dry neutralizer" which is comprised of a mixture of Necanol 90 and diethanolamine, and "coolant" which is straight Necanol 90. Neutralizer is what is added to a hot water bath to remove tint when it is desired to change the color of tint of the lens. Coolant is mixed with distilled water and used for cooling a generator which grinds lenses from a semi-finished to a finished state.

The term ophthalmic lens as used herein is intended to mean any lens of a optical quality transparent material intended to be worn by the user. The term can refer to reading glasses, non-prescription sun glasses, safety glasses, driving glasses, etc. and is not limited to prescription glasses.

Although the system was first designed for providing a packet for tinting plastic lenses, the invention has been described in great detail using a CR-39 lens by way of example, it will be readily apparent that the dye packet is capable of application to related applications, such as dying resin coated glass lenses, etc., and is thus capable of use in a number of other applications. Although this invention has been described in its preferred form with a certain degree of particularity with respect to a CR-39 lens, it is understood that the present disclosure of the preferred form has been made only by way of example and that numerous changes in the details of structures and the composition of the system may be resorted to without departing from the spirit and scope of the invention.

Now that the invention has been described,

What is claimed is:

1. A process for tinting an ophthalmic lens, the process comprising:
    (a) obtaining a water-soluble enclosure means;
    (b) introducing a quantity of dry powder dye into said water-soluble enclosure means;
    (c) sealing said water-soluble enclosure means to hermetically seal said dry powder dye within said enclosure means;
    (d) introducing the product of step (c) into an aqueous solvent to dissolve said water-soluble enclosure means and to dissolve or disperse said powder dye in said aqueous solvent to form an aqueous dye bath; and
    (e) submerging an ophthalmic lens to be tinted in said dye bath for a time sufficient to dye said opthalmic lens.

2. A process for tinting an ophthalmic lens, the process comprising:
   (a) obtaining a water-soluble, transparent film;
   (b) forming an envelope from said water-soluble, transparent film and introducing a quantity of dry powder dye into said envelope,
   (c) sealing said envelope to hermetically seal said dry powder dye;
   (d) introducing the product of step (c) into an aqueous solvent to dissolve said water-soluble, transparent film and to dissolve or disperse said dye thereby forming an aqueous dye bath; and
   (e) submerging an ophthalmic lens to be tinted in said dye bath for a time sufficient to dye said opthalmic lens.

3. A process as in claim 2, wherein said water-soluble, transparent film is a film selected from the group consisting of polyvinyl alcohol resin, polyethylene oxide resin, methyl cellulose, hydroxy propyl cellulose, and starch.

4. A process as in claim 2, wherein said water-soluble, transparent film is from 5 to 200µ in thickness.

5. A process as in claim 2, wherein said water soluble transparent film dissolves in water at 95° C.–100° C. in one minute or less.

6. A process as in claim 2, wherein said water soluble transparent film dissolves in water at 95° C.–100° C. in 30 seconds or less.

7. A process as in claim 2, further comprising enclosing the sealed envelope containing dry powder dye produced in step (c) in a non-water-soluble packaging material, which is removed before the envelope produced in © is introduced into the aqueous solvent in step (d).

8. A process as in claim 2, further comprising printing indicia on the sealed envelope containing dry powder dye produced in step (c).

9. A process for tinting an ophthalmic lens, the process comprising:
   (a) obtaining a plurality of gelatin capsules, wherein each of the capsules is in at least two sections;
   (b) introducing a quantity of dry powder dye into each of said capsules, (c) closing said capsules to seal said dry powder dye within said capsules;
   (d) adding at least one of said capsules to an aqueous solvent to dissolve said gelatin capsules and form an aqueous dye bath; and
   (e) submerging an ophthalmic lens to be tinted in said dye bath for a time sufficient to dye said opthalmic lens.

10. A process as in claim 9, wherein two or more capsules containing different dyes are added to said aqueous solvent in step (d).

11. A process as in claim 9, further comprising printing indicia on the closed capsules produced in step (c).

* * * * *